(12) United States Patent
Ogaki et al.

(10) Patent No.: US 8,956,723 B2
(45) Date of Patent: Feb. 17, 2015

(54) COATING LIQUID FOR COATING GLASS FIBER AND RUBBER-REINFORCING GLASS FIBER USING THE SAME

(75) Inventors: Katsuhiko Ogaki, Matsusaka (JP); Toshiya Monden, Matsusaka (JP); Takafumi Iwano, Tsu (JP)

(73) Assignee: Central Glass Company, Limited, Ube-shi (JP)

( * ) Notice: Subject to any disclaimer, the term of this patent is extended or adjusted under 35 U.S.C. 154(b) by 891 days.

(21) Appl. No.: 12/294,339

(22) PCT Filed: Mar. 29, 2007

(86) PCT No.: PCT/JP2007/056825
§ 371 (c)(1),
(2), (4) Date: Sep. 24, 2008

(87) PCT Pub. No.: WO2007/114228
PCT Pub. Date: Oct. 11, 2007

(65) Prior Publication Data
US 2009/0137355 A1 May 28, 2009

(30) Foreign Application Priority Data

Mar. 31, 2006 (JP) ................................. 2006-096566
Nov. 2, 2006 (JP) ................................. 2006-298398
Dec. 11, 2006 (JP) ................................. 2006-333406
Feb. 28, 2007 (JP) ................................. 2007-048455

(51) Int. Cl.
B32B 9/00 (2006.01)
C03C 25/10 (2006.01)
(Continued)

(52) U.S. Cl.
CPC ............. *C03C 25/1015* (2013.01); *C03C 25/50* (2013.01); *C08J 5/08* (2013.01);
(Continued)

(58) Field of Classification Search
CPC .. C03C 25/007; C03C 25/1015; C03C 25/24; C03C 25/48; C03C 2218/11; C03C 2218/111; C07C 39/367; C07C 37/20; C08L 61/06; C08L 63/00; C08L 2666/16; C08L 9/04; C08L 61/04; C08L 61/26; C08L 21/00; C08L 61/00; C08L 39/08; C08L 9/06; C08J 2309/04; C08J 3/07; C08J 2361/26; C08J 5/08; C08J 2321/00; C08J 5/06; C09D 109/08; C08G 59/08; C08G 8/00; C08G 8/08; C08G 8/10; C08G 8/20; F16G 1/28; F16G 1/08; F16G 1/10; C08K 5/008; C08K 2201/014; C09J 161/06; C09J 109/06; C09J 109/08; C09J 161/12; C09J 161/18; D07B 2205/2057; D07B 2501/2046; B32B 2255/02; B32B 2413/00; B32B 25/10; D06M 15/41; D06M 15/693; D06M 17/04
See application file for complete search history.

(56) References Cited

U.S. PATENT DOCUMENTS 3,448,078 A * 6/1969 Higginbottom ................ 528/138
3,642,553 A * 2/1972 Georges ..................... 156/307.5
(Continued)

FOREIGN PATENT DOCUMENTS

JP        57167367 A  * 10/1982
JP        63-126975 A    5/1988
(Continued)

OTHER PUBLICATIONS

International Search Report dated Jun. 19, 2007 with an English translation of the pertinent portions (Three (3) pages).

*Primary Examiner* — Jill Gray
(74) *Attorney, Agent, or Firm* — Crowell & Moring LLP

(57) ABSTRACT

A coating liquid for coating glass fiber cords, containing: a chlorophenol-formaldehyde condensate (A) obtained by condensing a chlorophenol (D) and formaldehyde (E) in water; an emulsion of a vinylpyridine-styrene-butadiene copolymer (B); and an emulsion of a chlorosulfonated polyethylene (C).

12 Claims, 2 Drawing Sheets

(51) Int. Cl.
  *C03C 25/50*    (2006.01)
  *C08J 5/08*     (2006.01)
  *C09D 123/04*   (2006.01)
  *C09D 123/34*   (2006.01)
  *C08G 8/14*     (2006.01)
  *C09D 161/06*   (2006.01)
  *C09D 121/00*   (2006.01)

(52) U.S. Cl.
  CPC ........... *C09D 123/04* (2013.01); *C09D 123/34* (2013.01); *C08G 8/14* (2013.01); *C09D 161/06* (2013.01); *C09D 121/00* (2013.01)
  USPC ........ 428/392; 428/375; 428/383; 428/296.1; 428/295.1; 428/394; 474/260; 474/261; 474/264; 525/189; 524/508; 524/509; 524/512

(56) References Cited

U.S. PATENT DOCUMENTS

| | | | |
|---|---|---|---|
| 3,855,168 A * | 12/1974 | Ozeki et al. | 524/510 |
| 4,236,564 A * | 12/1980 | Kalafus et al. | 152/565 |
| 4,376,854 A * | 3/1983 | Yamaguchi et al. | 528/137 |
| 4,424,238 A * | 1/1984 | Yotsumoto et al. | 427/381 |
| 4,593,070 A * | 6/1986 | Oyama et al. | 525/139 |
| 4,883,712 A * | 11/1989 | Ogawa et al. | 428/367 |
| 5,017,639 A * | 5/1991 | Mori et al. | 524/510 |
| 5,075,415 A * | 12/1991 | Yotsumoto et al. | 528/149 |
| 5,624,765 A * | 4/1997 | Toukairin et al. | 428/492 |
| 5,863,987 A * | 1/1999 | Nakamura et al. | 525/92 D |
| 6,117,035 A * | 9/2000 | Isshiki et al. | 474/205 |
| 6,406,397 B1 * | 6/2002 | Isshiki et al. | 474/263 |
| 6,521,681 B1 * | 2/2003 | Zingg et al. | 524/99 |
| 6,605,014 B2 * | 8/2003 | Isshiki et al. | 474/263 |
| 8,455,097 B2 * | 6/2013 | Monden et al. | 428/392 |
| 2009/0137355 A1 * | 5/2009 | Ogaki et al. | 474/271 |

FOREIGN PATENT DOCUMENTS

| | | | |
|---|---|---|---|
| JP | 3-65536 A | | 3/1991 |
| JP | 03167372 A | * | 7/1991 |
| JP | 4-126877 A | | 4/1992 |
| JP | 11-241275 A | | 7/1999 |
| JP | 2004-203730 A | | 7/2004 |
| JP | 2004-244785 A | | 9/2004 |
| JP | 2006-104595 A | | 4/2006 |
| WO | WO 2006/038490 A1 | | 4/2006 |

* cited by examiner

COATING LIQUID FOR COATING GLASS FIBER AND RUBBER-REINFORCING GLASS FIBER USING THE SAME

TECHNICAL FIELD

The present invention relates to a coating liquid for coating glass fibers to form a coating layer on a glass fiber cord usable as a reinforcement in various rubber products, so as to enhance adhesion of the glass fiber cord to a parent rubber and to improve heat resistance of the glass fiber cord, and also relates to a rubber-reinforcing glass fiber using the coating liquid.

BACKGROUND OF THE INVENTION

In order to provide a rubber product such as a transmission belt and a tire with tensile strength and dimensional stability, it is common practice to embed a high-strength fiber such as a glass fiber, a nylon fiber and a polyester fiber as a reinforcement in a parent rubber. A rubber-reinforcing fiber, for use as the reinforcement embedded in the parent rubber, needs to have good adhesion to the parent rubber to define a tight interface on which separation does not occur. The glass fiber itself cannot however be adhered to the parent rubber and, even if adhered, shows such weak adhesion as to cause interfacial separation and fails to function properly as the reinforcement.

Therefore, as the rubber-reinforcing glass fiber used by being embedded in the parent rubber in production of the transmission belt, those who produced by coating a glass fiber cord with a coating liquid for improving adhesion to the parent rubber are employed. More specifically, the rubber-reinforcing glass fiber commonly used for improving adhesion between the parent rubber and the glass fiber cord and for preventing the interfacial separation is produced by applying a coating liquid in which a resorcinol-formaldehyde resin and various latex components are dispersed in water to a glass fiber cord of filament yarn and then drying the glass fiber cord to form a coating layer.

The coating layer has the effect of making adhesion between the parent rubber and the glass fiber cord, when the rubber-reinforcing glass fiber is embedded in the parent rubber at high temperatures to form the transmission belt; however, adhesiveness, i.e. adhesive strength is not enough. For example, a heat-resistant rubber such as hydrogenated nitrile rubber (cross-linked with sulfur or peroxide and hereinafter abbreviated as "HNBR") is employed as the parent rubber of an automotive transmission belt for use in a high-temperature engine room environment. In the case where the rubber-reinforcing glass fiber is treated only with the above coating process and embedded, however, the transmission belt cannot maintain an initial adhesion strength during running where the transmission belt is continuously bent under high-temperature conditions. This can result in the occurrence of interfacial separation between the rubber-reinforcing glass fiber and the parent rubber during long hours of running.

Patent Documents 1 to 4 disclose rubber-reinforcing glass fibers for use in transmission belts which can maintain adhesion between the rubber-reinforcing glass fibers and HNBR without causing interfacial separation therebetween to secure long-term reliability even under high-temperature running conditions, by performing the above coating process to form a first coating layer on a glass fiber cord and then by applying a second coating liquid of different compositions to a second coating layer and drying to form the second coating layer.

For example, Patent Document 1 discloses a technique for making a coating treatment on the glass fiber cord to produce the rubber-reinforcing glass fiber, the technique using a second coating liquid containing a halogen-containing polymer and an isocyanate.

Patent Document 2 discloses a rubber-reinforcing glass fiber on which first and second coating layers are formed, the first coating layer being formed by applying a treating agent containing a resorcin.formalin condensate and rubber latex to a rubber-reinforcing glass fiber while the second coating layer is formed by applying a treating agent of different compositions to the first coating layer. This rubber-reinforcing glass fiber is characterized in that the treating agent for the second coating layer contains a rubber blended material, a curing agent and a curing auxiliary as main components.

Patent Document 3 filed by the present applicant discloses a rubber-reinforcing glass fiber having a coating layer and a further coating layer. The coating layer is produced by drying a coating liquid for coating glass fibers after applying it to a glass fiber cord, the coating liquid being an emulsion in which an acrylic ester resin, a vinylpyridine-stylene-butadiene copolymer and a resorcinol-formaldehyde resin are dispersed in water. The further coating layer is formed by applying a further coating liquid for coating glass fibers to the coating layer, the further coating liquid being produced by dispersing a halogen-containing polymer and a bisallylnagiimide in an amount of 0.3 wt % to 10.0 wt % relative to the halogen-containing polymer in an organic solvent. This rubber-reinforcing glass fiber exhibits good adhesive strength in adhesion to HNBR.

Patent Document 4 filed by the present applicant discloses a rubber-reinforcing glass fiber produced having first and second coating layers. The first coating layer is formed by applying a first coating liquid for coating glass fibers to a glass fiber cord to form a coating film and then drying and curing the coating film. The second coating layer is formed by applying a second coating liquid of different compositions to the first coating layer to form a coating film and then drying and curing the coating film. This rubber-reinforcing glass fiber is characterized in that the second coating liquid is obtained by dispersing bisallylnagiimide, a rubber elastomer, a vulcanization agent and an inorganic filler in an organic solvent. This rubber-reinforcing glass fiber shows good adhesive strength in adhesion to HNBR and, when embedded in HNBR for use in the transmission belt, shows high heat resistance without reduction in tensile strength even after long hours of running under high-temperature conditions.

Conventionally, an automotive timing belt used as a heat resistant transmission belt reinforced with a rubber-reinforcing glass fiber had been produced to have a coating layer and a second coating layer formed on the coating layer, and had been embedded in a heat resistant rubber such as HNBR, the coating layer being formed by applying a coating liquid containing a resorcin.formalin condensate as an essential component to a glass fiber cord and drying it, the second coating layer being formed by applying a coating liquid of different components to the coating layer and drying it.

The above conventional transmission belt secures initial strength of adhesion between the rubber-reinforcing glass fiber produced by applying the coating material to the glass fiber cord and the parent rubber, but does not secure both high water resistance and high heat resistance and does not maintain a tensile strength without changes in dimension even after long hours of running under high-temperature and high-humidity conditions.

Therefore, much further developments of the transmission belt and of the rubber-reinforcing glass fiber are desired.

More specifically, the transmission belt is required to have an equal or superior adhesive strength between the rubber-reinforcing glass fiber and a heat resistant rubber, an equal or superior water resistance with which the coating layer can maintain the initial adhesive strength even with dropping of water on the transmission belt, and an equal or superior heat resistance with which the coating layer can maintain the initial adhesive strength even after long hours of running under high-temperature high-humidity conditions, as compared to the conventional transmission belt produced by embedding the rubber-reinforcing glass fibers as discussed in Patent Documents 1 to 4 in the heat resistant rubber.

Patent Document 5 filed by the present applicant discloses a coating liquid for coating glass fiber cords, in which an emulsion is formed by dispersing a monohydroxybenzene-formaldehyde condensate, a vinylpyridine-styrene-butadiene copolymer and a chlorosulfonated polyethylene in water.

Patent Document 6 filed by the present applicant discloses: a rubber-reinforcing glass fiber provided with a first coating layer formed by applying the coating liquid as disclosed in Patent Document 5, and a second coating layer formed on the first coating layer and containing a halogen-containing polymer and bisallylnadiimide; a rubber-reinforcing glass fiber provided with a second coating layer formed on the first coating layer which second coating layer contains a halogen-containing polymer and a maleimide; a rubber-reinforcing glass fiber provided with a second coating layer formed on the first coating layer which second coating layer contains a halogen-containing polymer, an organic diisocyanate and zinc methacrylate; and a rubber-reinforcing glass fiber provided with a second coating layer formed on the first coating layer which second coating layer contains a halogen-containing polymer and a triazine compound.

Further, Patent Document 7 discloses an impregnant for glass fibers, containing a resorcin-chlorophenol-formaldehyde resin. The resorcin-chlorophenol-formaldehyde resin is a water-soluble addition condensate obtained by reacting resorcin, chlorophenol and formaldehyde in the form of an aqueous solution, and is available from ICI under the trade name of "Vulcabond E" as an aqueous solution containing water-soluble resorcin-chlorophenol-formaldehyde resin and having solid content of about 20 wt %.

Patent Document 1: Japanese Examined Patent Publication No. 2-4715

Patent Document 2: Japanese Laid-Open Patent Publication No. 11-241275

Patent Document 3: Japanese Laid-Open Patent Publication No. 2004-203730

Patent Document 4: Japanese Laid-Open Patent Publication No. 2004-244785

Patent Document 5: Japanese Laid-Open Patent Publication No. 2006-104595

Patent Document 6: International Publication 2006/038490 Pamphlet

Patent Document 7: Japanese Laid-Open Patent Publication No. 3-65536

SUMMARY OF THE INVENTION

It is, therefore, an object of the present invention to provide a coating liquid for coating glass fibers, the coating liquid providing an adhesive strength equal or superior to conventional one between a glass fiber cord and a parent rubber.

Another object of the present invention is to provide a transmission belt having an equal or superior water resistance with which the coating layer can maintain the initial adhesive strength even with dropping of water on the transmission belt, and an equal or superior heat resistance with which the coating layer can maintain the initial adhesive strength even after long hours of running under high-temperature high-humidity conditions, as compared to the conventional transmission belt; a coating liquid for coating glass fiber which can provided the same; a rubber-reinforcing glass fiber; and a transmission belt formed embedding the rubber-reinforcing glass fiber in a heat resistant rubber.

A chlorophenol-formaldehyde condensate obtained by reacting formaldehyde with chlorophenol is lower in water solubility than that of a resorcin-formaldehyde condensate which has been used for a conventional coating liquid for coating glass fibers, so as to be poor in stability as liquid even if once dissolved in water. Thus, the chlorophenol-formaldehyde condensate is easy to precipitate and therefore not used for the coating liquid for coating glass fibers.

Though the chlorophenol-formaldehyde condensate obtained by reacting formaldehyde with chlorophenol is low in water solubility, its precipitate formed in a reaction solution can be dissolved by adding alkali or the like to the reaction solution. If an emulsion of a vinylpyridine-styrene-butadiene copolymer and/or an emulsion of a chlorosulfonated polyethylene are then mixed with the reaction solution for the purpose of preparing the coating liquid for coating glass fibers, however, the chlorophenol-formaldehyde condensate is precipitated again.

If the coating liquid for coating glass fibers is prepared by adding a strong alkali such as sodium hydroxide to the reaction solution to dissolve the precipitate of the chlorophenol-formaldehyde condensate and then mixing the emulsion of the vinylpyridine-styrene-butadiene copolymer and/or the emulsion of the chlorosulfonated polyethylene with the reaction solution, the chlorophenol-formaldehyde condensate is not precipitated. However, sodium hydroxide is a strong alkali so that the glass fiber cord to which the coating liquid for coating glass fibers is applied is damaged. Additionally, the rubber-reinforcing glass fiber produced by applying the coating liquid for coating glass fibers to the glass fiber cord is reduced in tensile strength.

An aspect of the present invention resides in a coating liquid for coating glass fiber cords, comprising: a chlorophenol-formaldehyde condensate (A) obtained by condensing a chlorophenol (D) and formaldehyde (E) in water; an emulsion of a vinylpyridine-styrene-butadiene copolymer (B); and an emulsion of a chlorosulfonated polyethylene (C).

More specifically, the coating liquid for coating glass fiber cords contains: an aqueous solution of the chlorophenol-formaldehyde condensate (A) obtained by condensing the chlorophenol (D) and formaldehyde (E) in water; the emulsion of the vinylpyridine-styrene-butadiene copolymer (B); and the emulsion of the chlorosulfonated polyethylene (C).

A first embodiment of the coating liquid for coating glass fiber cords, according to the present invention is produced by adding an alcohol compound having a compatibility with water, i.e. a water solubility and containing at least one selected from monohydric alcohol compounds, glycol compounds and triol compounds to a reaction solution in which a chlorophenol-formaldehyde condensate (A) obtained by condensing a chlorophenol (D) and formaldehyde (E) in water is precipitated, and then by mixing an emulsion of a vinylpyridine-styrene-butadiene copolymer (B) and an emulsion of a chlorosulfonated polyethylene (C) into an aqueous solution of the chlorophenol-formaldehyde condensate (A) which aqueous solution is prepared by dissolving the precipitate of the chlorophenol-formaldehyde condensate (A). In the present invention, "an alcohol compound" is a compound formed by substituting a hydroxyl group for a hydrogen atom of a hydrocarbon and includes a monohydric alcohol compound having one hydroxyl group, a glycol (diol) compound having two hydroxyl groups, and a triol compound having three hydroxyl groups.

As a result of eager studies by the inventors, it is found that the chlorophenol-formaldehyde condensate (A) is not precipitated even after mixing the emulsion of the vinylpyridine-styrene-butadiene copolymer (B) and the emulsion of the chlorosulfonated polyethylene (C) into the aqueous solution of the chlorophenol-formaldehyde condensate (A) in preparation of the coating liquid for coating glass fiber cords, when the precipitate of the chlorophenol-formaldehyde condensate (A) obtained by condensing the chlorophenol (D) and formaldehyde (E) in water is dissolved with the addition of at least one water-soluble alcohol compound selected from a monohydric alcohol, a glycol compound and a triol compound.

As discussed above, at least one water-soluble alcohol compound selected from the monohydric alcohol compound, the glycol compound and the triol compound can be added in order to dissolve the precipitate of the chlorophenol-formaldehyde condensate (A) obtained by condensation reaction in water.

The aqueous solution of the chlorophenol-formaldehyde condensate (A) is made stable with the addition of the water-soluble alcohol compound so as not to form the precipitate of the chlorophenol-formaldehyde condensate (A), which is probably because a hydroxyl group of the chlorophenol-formaldehyde condensate (A) and that of the alcohol compound form the hydrogen bond which is three-dimensionally strong. The alcohol compound is considered to have the effect of stabilizing the chlorophenol-formaldehyde condensate (A) in the aqueous solution since the alcohol compound has a high dipole moment and a high dielectric constant so as to strongly produce a long-distance interaction such as dispersion force. Further, the alcohol compound is considered to have the effect of stabilizing the chlorophenol-formaldehyde condensate (A) in the aqueous solution since a high interaction energy due to coordinate valence (or charge transfer) makes bonding not only between solvent and solute but also between solvent and solvent thereby producing a strong solvation. The stabilizing effect is larger in the glycol compound and triol compound having the larger number of hydroxyl groups, than in the monohydric alcohol compound, and is particularly excellent in the glycol compound.

Additionally, the use of an alcohol compound having a boiling point of lower than 50° C. for the coating liquid for coating glass fibers promotes volatilization of the alcohol compound so that such an alcohol compound is hard to handle. Volatilization of alcohol compounds makes the chlorophenol-formaldehyde condensate (A) precipitate. When an alcohol compound having a boiling point of higher than 250° C. is used for the coating liquid for coating glass fibers, volatilization of the alcohol compound from the coating layer becomes difficult to occur at the time of applying the coating liquid for coating glass fibers to the glass fiber cord to coat the glass fiber cord. When the alcohol compound is not removed from the coating layer, the transmission belt formed by embedding the glass fiber cord in the heat resistant rubber is reduced in heat resistance and water resistance. It is therefore preferable to use, for the coating liquid for coating glass fibers, at least one alcohol compound selected from the monohydric alcohol compound, the glycol compound and the triol compound, having water solubility and a boiling point of not lower than 50° C. and not higher than 250° C.

On the other hand, the precipitate of the chlorophenol-formaldehyde condensate (A) obtained by condensing the chlorophenol (D) and formaldehyde (E) in water can be dissolved with the addition of alkali in place of the above-mentioned alcohol compound. In the coating liquid for coating glass fibers according to the present invention, amine compounds are preferable as alkali.

A second embodiment of the coating liquid for coating glass fiber cords, according to the present invention is produced by adding an amine compound to a reaction solution in which a chlorophenol-formaldehyde condensate (A) obtained by condensing a chlorophenol (D) and formaldehyde (E) in water is precipitated, and then by mixing an emulsion of a vinylpyridine-styrene-butadiene copolymer (B) and an emulsion of a chlorosulfonated polyethylene (C) into an aqueous solution of the chlorophenol-formaldehyde condensate (A) which aqueous solution is prepared by dissolving the precipitate of the chlorophenol-formaldehyde condensate (A).

More specifically, it is confirmed that, in a case where the precipitate of the chlorophenol-formaldehyde condensate (A) formed by condensing the chlorophenol (D) and formaldehyde (E) in water is dissolved with the addition of the amine compound in place of strong alkali such as sodium hydroxide, the chlorophenol-formaldehyde condensate (A) is not precipitated again even if the emulsion of the vinylpyridine-styrene-butadiene copolymer (B) and the emulsion of the chlorosulfonated polyethylene (C) are mixed into the aqueous solution the chlorophenol-formaldehyde condensate (A) to prepare the coating liquid for coating glass fibers after dissolving the precipitate of the chlorophenol-formaldehyde condensate (A) formed by condensing the chlorophenol (D) and formaldehyde (E) in water.

DETAILED DESCRIPTION OF THE INVENTION

Figure 1:
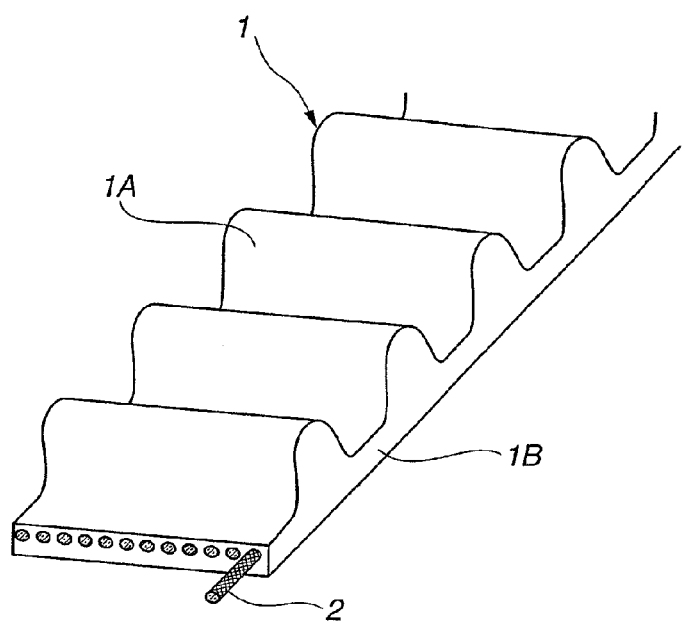
FIG. 1 is a perspective sectional view of the transmission belt produced by embedding rubber-reinforcing glass fibers in the heat resistant rubber.

According to the present invention, a coating liquid for coating glass fibers can be obtained, the coating liquid becoming a coating layer on a glass fiber cord thereby imparting a good adhesive strength to adhesion between the glass fiber cord and a parent rubber formed of HNBR (hydrogenated nitrile-butadiene rubber). More specifically, the coating liquid for coating glass fibers is applied to a glass fiber cord and then dried to form a coating layer, thereby producing a rubber-reinforcing glass fiber. The rubber-reinforcing glass fiber contributes to imparting not only water resistance but also heat resistance to a transmission belt, when embedded in HNBR to form the transmission belt. The rubber-reinforcing glass fiber according to the present invention is thus embedded in HNBR for reinforcing the transmission belt which can transmit driving force from driving sources such as an engine and a motor, and more specifically for reinforcing an automotive transmission belt such as a timing belt. The rubber-reinforcing glass fiber is able to maintain tensile strength of the automotive transmission belt even in the presence of high-temperature and high-humidity and is able to impart dimensional stability to the automotive transmission belt.

According to the present invention, an alcohol compound or an amine compound is added to dissolve a chlorophenol-formaldehyde condensate (A) precipitated by condensing a chlorophenol (D) and formaldehyde (E) in water. With this, a coating liquid for coating glass fiber cords is obtained without precipitation of the chlorophenol-formaldehyde condensate (A) even when mixing an emulsion of a vinylpyridine-styrene-butadiene copolymer (B) and an emulsion of a chlorosulfonated polyethylene (C) with an aqueous solution of the chlorophenol-formaldehyde condensate (A).

The coating liquid for coating glass fiber cords according to the present invention, formed by mixing an emulsion of a vinylpyridine-styrene-butadiene copolymer (B) and an emulsion of a chlorosulfonated polyethylene (C) with a chlorophenol-formaldehyde condensate (A) obtained by condensing a chlorophenol (D) and formaldehyde (E) in water, is applied to a glass fiber cord to form a coating layer thereon, thereby forming a rubber-reinforcing glass fiber. The thus obtained rubber-reinforcing glass fiber is able to impart an excellent adhesive strength between the glass fiber cord and HNBR when embedded in HNBR (a heat resistant rubber).

Further, the transmission belt formed of HMBR in which the rubber-reinforcing glass fiber according to the present invention is embedded has heat resistance, and therefore has both heat resistance and water resistance. Hence, even after a long period of use as the transmission belt or even after a long period of running of the transmission belt in the presence of high-temperature and high-humidity, there is no fear of exfoliation at an interface between the rubber-reinforcing glass fiber and the heat resistant rubber so that the transmission belt can maintain its tensile strength and can be excellent in dimensional stability.

The rubber-reinforcing glass fiber is provided by applying the coating liquid according to the present invention to a glass fiber cord to form a coating layer on the glass fiber cord, the coating liquid comprising a chlorophenol-formaldehyde condensate (A) obtained by condensing a chlorophenol (D) and formaldehyde (E) in water, an emulsion of a vinylpyridine-styrene-butadiene copolymer (B) and an emulsion of a chlorosulfonated polyethylene (C). When this rubber-reinforcing glass fiber is embedded in HNBR (a heat resistant rubber), an adhesive strength exhibited between the rubber-reinforcing glass fiber and HNBR is excellent and equal to that exhibited when a conventional coating liquid for coating glass fibers which liquid comprises an emulsion where a resorcinol-formaldehyde condensate, vinylpyridine-styrene-butadiene copolymer and chlorosulfonated polyethylene are dispersed in water is used.

In order to dissolve a chlorophenol-formaldehyde condensate (A) in water, it has been usual to add alkali such as ammonia and sodium hydroxide to a reaction solution in which the chlorophenol-formaldehyde condensate (A) is precipitated.

However, in a case where a precipitate of the chlorophenol-formaldehyde condensate (A) is dissolved with the addition of alkali having a small basicity constant (Kb) such as ammonia and then an emulsion of a vinylpyridine-styrene-butadiene copolymer (B) and an emulsion of a chlorosulfonated polyethylene (C) are mixed therewith, an additional precipitation of the chlorophenol-formaldehyde condensate (A) is to occur.

In a case where the precipitate of the chlorophenol-formaldehyde condensate (A) is dissolved with the addition of alkali having a large basicity constant (Kb) such as sodium hydroxide and then the emulsion of the vinylpyridine-styrene-butadiene copolymer (B) and the emulsion of the chlorosulfonated polyethylene (C) are mixed therewith, the additional precipitation of the chlorophenol-formaldehyde condensate (A) is suppressed. However, sodium hydroxide is so strongly alkaline as to deteriorate the glass fiber or as to weaken tensile strength of the transmission belt, and therefore hard to use.

However, if the precipitate of the chlorophenol-formaldehyde condensate (A) is dissolved by adding an alcohol compound to a reaction solution in which the chlorophenol-formaldehyde condensate (A) is precipitated and then the emulsion of the vinylpyridine-styrene-butadiene copolymer (B) and the emulsion of the chlorosulfonated polyethylene (C) are mixed thereinto, the precipitation of the chlorophenol-formaldehyde condensate (A) is found to be difficult to occur. Furthermore, the glass fiber is not deteriorated and therefore tensile strength of the transmission belt is not reduced. In this specification, "an alcohol compound" is a compound formed by substituting a hydroxyl group for a hydrogen atom in a hydrocarbon and includes a monohydric alcohol compound having one hydroxyl group, a glycol (diol) compound having two hydroxyl groups, and a triol compound having three hydroxyl groups.

Sodium hydroxide is, hence, added to a mixture solution of the chlorophenol (D) and formaldehyde (E) in the smallest amount needed to make condensation reaction, and not added excessively. The condensation reaction is made at a temperature of not less than 30° C. and not more than 95° C. for 4 hours or more with stirring the mixture solution, thereby obtaining a reaction solution in which a precipitate of the chlorophenol-formaldehyde condensate (A) is formed. The precipitate of the chlorophenol-formaldehyde condensate (A) is dissolved by adding a water-soluble alcohol compound to the reaction solution with stirring the solution, thereby obtaining an aqueous solution of the chlorophenol-formaldehyde condensate (A).

The alcohol compound is added in an amount of not less than 50% and not more than 500% by weight based on 100% of the weight of the amount of the chlorophenol-formaldehyde condensate (A). In other words, the alcohol compound is added to have a weight of not less than ½ and not more than 5 time as large as the weight of the chlorophenol-formaldehyde condensate (A).

When the alcohol compound is added in an amount of less than 50% by weight relative to the amount of the chlorophenol-formaldehyde condensate (A), the effect of dissolving the precipitate of the chlorophenol-formaldehyde condensate (A) is not enough. Meanwhile, it is not necessary to add the alcohol compound in an amount of more than 500% relative to the amount of the chlorophenol-formaldehyde condensate (A). If a glycol is added in an amount exceeding 500 wt %, a concentration of total of the chlorophenol-formaldehyde condensate (A), the emulsion of the vinylpyridine-styrene-butadiene copolymer (B) and the emulsion of the chlorosulfonated polyethylene (C) is reduced in the coating liquid for coating glass fiber cords so that the rubber-reinforcing glass fiber produced by applying the coating liquid for coating glass fiber cords to a glass fiber cord loses its flexibility.

In this specification, "the weight of the chlorophenol-formaldehyde condensate (A)" is the weight of a residue obtained by heating the reaction solution until liquid evaporates, the reaction solution including the precipitate of the chlorophenol-formaldehyde condensate (A) formed by condensing the chlorophenol (D) and formaldehyde (E) in water. In evaporation, unreacted chlorophenol (D) and unreacted formaldehyde (E) are volatilized.

Examples of the alcohol compound added in the present invention for dissolving the precipitate of the chlorophenol-formaldehyde condensate (A) include methanol ($CH_3OH$, having a boiling point of 65° C.), ethanol ($C_2H_5OH$, having a boiling point of 78° C.), n-propanol ($C_3H_8O$, having a boiling point of 97° C.), isopropanol ($C_3H_8O$, having a boiling point of 82° C.), 2-methoxyethanol (ethylene glycol monomethyl ether: $C_3H_8O_2$, having a boiling point of 124° C.), propylene glycol ($C_3H_8O_2$, having a boiling point of 188° C.), 2-methoxymethylethoxypropanol ($C_7H_{16}O_3$, having a boiling point of 190° C.), 1-methoxy-2-propanol ($C_4H_{10}O_2$, having a boiling point of 120° C.), ethylene glycol (1,2-ethanediol: $C_2H_6O_2$, having a boiling point of 196° C.), diethylene glycol ($C_4H_{10}O_3$, having a boiling point of 244° C.), 1,2-diethoxyethane ($C_6H_{14}O_2$, having a boiling point of 123° C.), and glycerin ($C_3H_8O_3$, having a boiling point of 171° C.). Of these, preferable examples are n-propanol ($C_3H_8O$), isopropanol ($C_3H_8O$), 2-methoxyethanol (ethylene glycol monomethyl ether: $C_3H_8O_2$), propylene glycol ($C_3H_8O_2$), 2-methoxymethylethoxypropanol ($C_7H_{16}O_3$), 1-methoxy-2-propanol ($C_4H_{10}O_2$), ethylene glycol (1,2-ethanediol: $C_2H_6O_2$), diethylene glycol ($C_4H_{10}O_3$) and 1,2-diethoxyethane ($C_6H_{14}O_2$). Of these preferable examples, 2-methoxyethanol and propylene glycol are particularly preferable alcohol compounds for use in the coating liquid for coating glass fibers according to the present invention, since these are, when the coating liquid for coating glass fibers is applied to and dried on a glass fiber cord to form a coating layer, vaporized and therefore do not remain in the coating layer. In addition to this, 2-methoxyethanol or propylene glycol greatly brings about the effect of stabilizing the aqueous solution of the chlorophenol-formaldehyde condensate (A).

As mentioned above, a glycol (or diol) having two hydroxyl groups may be used for the coating liquid for coating glass fibers for the purpose of dissolving the precipitate of the chlorophenol-formaldehyde condensate (A). Some of the glycols (or diols) form gel if water is added to control the concentration of the coating liquid. However, either 2-methoxyethanol or propylene glycol does not form gel as far as the concentration is controlled within a required range, and additionally both of them are safe against flame and low in toxicity and have a low boiling point so as not to bring about the event where an operator breathes them. Further, both 2-methoxyethanol and propylene glycol are excellent in environmental conservation, market price and practical utility, and therefore particularly preferable for use in the coating liquid for coating glass fibers according to the present invention.

Methanol and ethanol included in a monohydric alcohol compound having one hydroxyl group and glycerin included in a triol compound having hydroxyl groups can be applied to a glass fiber cord, when these are used for the coating liquid for coating glass fibers for the purpose of dissolving the precipitate of the chlorophenol-formaldehyde condensate (A) and when the coating liquid has a high concentration. However, if water is added in order to control the concentration of the coating liquid at the time of coating, a gel is easily formed and precipitated so that the concentration of the coating liquid becomes hard to be controlled.

In the second embodiment of the coating liquid for coating glass fibers according to the present invention, an amine compound having a basicity constant (Kb) of not less than $5\times10^{-5}$ and not more than $1\times10^{-3}$ may be used.

A basicity constant (Kb) is a measure of basicity which means the degree to which alkalis accept hydrogen ions from a solution, and is an equilibrium constant of the following equation.

$$RNH_2 + H_2O \leftrightarrows RNH_3^+ + OH^- \qquad [1]$$

In order to dissolve the chlorophenol-formaldehyde condensate (A) in water, it has been usual to add an alkali such as ammonia and sodium hydroxide to a reaction solution in which the chlorophenol-formaldehyde condensate (A) is precipitated. Then, if the emulsion of the vinylpyridine-styrene-butadiene copolymer (B) and the emulsion of the chlorosulfonated polyethylene (C) are added thereto, the above-mentioned problems are to come up.

However, if an amine compound is added to the reaction solution thereby dissolving the precipitate of the chlorophenol-formaldehyde condensate (A) included in the reaction solution and thereafter the emulsion of the vinylpyridine-styrene-butadiene copolymer (B) and the emulsion of the chlorosulfonated polyethylene (C) are mixed into the reaction solution, a further precipitation of the chlorophenol-formaldehyde condensate (A) can be difficult to occur so as not to deteriorate the glass fiber and not to reduce the transmission belt in tensile strength.

More specifically, sodium hydroxide is added to a mixture solution of the chlorophenol (D) and formaldehyde (E) in the smallest amount needed to make condensation reaction, and not added excessively. The condensation reaction is made at a temperature of not less than 30° C. and not more than 95° C. for 4 hours or more with stirring the mixture solution, thereby obtaining a reaction solution in which a precipitate of the chlorophenol-formaldehyde condensate (A) is formed. The precipitate of the chlorophenol-formaldehyde condensate (A) is dissolved by adding an amine compound to the reaction solution with stirring the solution, thereby obtaining an aqueous solution of the chlorophenol-formaldehyde condensate (A).

In order to stabilize the chlorophenol-formaldehyde condensate (A) so as not to induce a further precipitation after the precipitate of the chlorophenol-formaldehyde condensate (A) included in the reaction solution is dissolved with the addition of the amine compound, the amine compound to be added to the reaction solution of the chlorophenol-formaldehyde condensate (A) has a basicity constant (Kb), for example, of not less than $5\times10^{-5}$ and not more than $1\times10^{-3}$.

When the amine compound to be added to the chlorophenol-formaldehyde condensate (A) has a basicity constant (Kb) of less than $5\times10^{-5}$ and then the emulsion of the vinylpyridine-styrene-butadiene copolymer (B) and the emulsion of the chlorosulfonated polyethylene (C) are mixed into the chlorophenol-formaldehyde condensate (A), a further precipitate of the chlorophenol-formaldehyde condensate (A) becomes easier to be formed with time.

Meanwhile, the amine compound having a basicity constant (Kb) of larger than $1\times10^{-3}$ is inferior in adhesive strength imparted between the glass fiber cord and the heat resistant rubber when the coating liquid for coating glass fibers which liquid contains the amine compound is applied to the glass fiber cord and when the glass fiber cord is embedded in the heat resistant rubber.

The amine compound is added in an amount of not less than 50% and not more than 500% by weight relative to the amount of the chlorophenol-formaldehyde condensate (A). In other words, the amine compound is added to have a weight of not less than ½ and not more than 5 relative to the weight of the chlorophenol-formaldehyde condensate (A).

When the amine compound is added in an amount of less than 50.0% by weight relative to the amount of the chlorophenol-formaldehyde condensate (A), the effect of dissolving the precipitate of the chlorophenol-formaldehyde condensate (A) is not enough. Meanwhile, it is not necessary to add the amine compound in an amount of more than 500% relative to the amount of the chlorophenol-formaldehyde condensate (A). If the amount of the amine compound exceeds 500.0 wt %, a concentration of total of the chlorophenol-formaldehyde condensate (A), the emulsion of the vinylpyridine-styrene-butadiene copolymer (B) and the emulsion of the chlorosulfonated polyethylene (C) is reduced in the coating liquid for coating glass fiber cords, so that the rubber-reinforcing glass fiber produced by applying the coating liquid to the glass fiber cords loses its flexibility.

Examples of the amine compound to be added to the chlorophenol-formaldehyde condensate (A) in the present invention are methylamine, ethylamine, tert-butylamine, dimethylamine, diethylamine, triethylamine, tri-n-buthylamine, methanolamine, dimethanolamine, monoethanolamine, and diethanolamine. Of these, dimethylamine and diethylamine so low in price as to be readily available and monoehtanolamine and diethanolamine both of which do not have an odor peculiar to amines and is easy to handle are particularly preferable examples of the amine compound for use in the coating liquid for coating glass fibers according to the present invention. The basicity constants (Kb) of the above-mentioned amine compounds are described in the third edition of Organic Chemistry, vol. 2, published by Tokyo kagaku dojin Co., Ltd. or in the second printing of Organic Chemistry Glossary published by Asakura Publishing Co., Ltd., p. 167-175, in which dimethylamine and diethanolamine have basicity constants (Kb) of $5.4 \times 10^{-4}$ and $1.0 \times 10^{-4.5}$, respectively.

It is preferable, in the chlorophenol-formaldehyde condensate (A) used for the coating liquid for coating glass fibers according to the present invention, that formaldehyde (E) has a mole ratio of not less than 0.5 and not more than 3.0 to the chlorophenol (D). In other words, a mole ratio of formaldehyde (E) to the chlorophenol (D), represented by "E/D", is preferably not smaller than 0.5 and not larger than 3.0. Further, it is preferable that the chlorophenol-formaldehyde condensate (A) is a resol resin reacted in the presence of a basic catalyst.

When a mole ratio of formaldehyde (E) to the chlorophenol (D) in the coating liquid for coating glass fibers according to the present invention, represented by "E/D" is less than 0.5, the adhesive strength between the rubber-reinforcing glass fiber and the heat resistant rubber is not enough. Meanwhile, a mole ratio "E/D" exceeding 3.0 tends to make the coating liquid a gel.

It is preferable that the coating liquid for coating glass fibers according to the present invention contains: the chlorophenol-formaldehyde condensate (A) at a mole ratio represented by "A/(A+B+C)" of not less than 1.0 wt % and not more than 15.0 wt %; the vinylpyridine-styrene-butadiene copolymer (B) at a mole ratio represented by "B/(A+B+C)" of not less than 45.0 wt % and not more than 82.0 wt %; and the chlorosulfonated polyethylene (C) at a mole ratio represented by "C/(A+B+C)" of not less than 3.0 wt % and not more than 40.0 wt %. With this, the transmission belt produced in such a manner that the rubber-reinforcing glass fiber coated with the coating liquid is embedded in the heat resistant rubber can obtain an adhesive strength between the rubber-reinforcing glass fiber and the heat resistant rubber.

The chlorophenol-formaldehyde condensate (A) may be partly replaced with a monohydroxybenzene-formaldehyde condensate and/or a resorcinol-formaldehyde condensate, which brings about, for example, the effect of imparting flexibility to the rubber-reinforcing glass fiber. The coating layer is formed on the rubber-reinforcing glass fiber while maintaining each composition of the components contained in the coating liquid.

A part of the vinylpyridine-styrene-butadiene copolymer (B) which is one component of the coating liquid for coating glass fibers may be replaced with another rubber elastomer. If the vinylpyridine-styrene-butadiene copolymer (B) is singly used, the coating layer formed on the rubber-reinforcing glass fiber becomes so adhesive or transferable as to make it difficult to conduct the steps cleanly, which impairs workability. Examples of the another rubber elastomer are a carboxyl-group-modified styrene-butadiene copolymer and acrylonitrile-butadiene copolymer. However, styrene-butadiene copolymer (G) is particularly preferably used, since it is compatible with the vinylpyridine-styrene-butadiene copolymer and impairs neither adhesiveness to the parent rubber nor heat resistance of the transmission belt formed embedding the styrene-butadiene copolymer (G) therein as the parent rubber.

The vinylpyridine-styrene-butadiene copolymer (B) may be preferably replaced with the styrene-butadiene copolymer (G) in an amount (represented by "G/B") of not less than 5.0% and not more than 80.0% by weight relative to the styrene-butadiene copolymer (G). The styrene-butadiene copolymer (G) having an amount of less than 5.0% provides adhesiveness to the coating layer of the rubber-reinforcing glass fiber, which lowers the effect of suppressing transcription onto the coating layer. It is, therefore, preferable that the styrene-butadiene copolymer (G) has an amount of not less than 25.0%. Additionally, both adhesiveness to the parent rubber and heat resistance of the transmission belt formed such that the styrene-butadiene copolymer (G) is embedded in the heat resistant rubber as the parent rubber are lost if an amount of the styrene-butadiene copolymer (G) exceeds 80.0%, so that it is preferable that the styrene-butadiene copolymer (G) has an amount not more than 55.0%.

The styrene-butadiene copolymer (G) is commercially available, for example, from NIPPON A&L INC. under the trade name of J-9049, and is able to be used for the coating liquid for forming a coating layer on the rubber-reinforcing glass fiber of the present invention.

The vinylpyridine-styrene-butadiene copolymer (B) used as one component of the coating liquid for coating glass fibers according to the present invention is preferably polymerized to have a composition where vinylpyridine:styrene:butadiene is (10-20 parts by weight): (10-20 parts by weight): (60-80 parts by weight). Such a vinylpyridine-styrene-butadiene copolymer (B) is commercially available and exemplified by: PYRATEX of NIPPON A&L INC.; No. 0650 of JSR Corporation; and Nipol No. 1218FS of ZEON CORPORATION. When a vinylpyridine-styrene-butadiene copolymer (B) included in the coating liquid for coating glass fibers does not have the above-mentioned composition, the rubber-reinforcing glass fiber produced in such a manner that the coating liquid is applied to and dried on a glass fiber cord to form a coating layer on the glass fiber cord is inferior in adhesive strength to the parent rubber.

The chlorosulfonated polyethylene (C) used as one component of the coating liquid for coating glass fibers according to the present invention preferably has a chlorine content of not less than 20.0 wt % and not more than 40.0 wt % and has in sulfonic groups a sulfur content of not less than 0.5 wt % and not more than 2.0 wt %. For example, a latex having a solid content of about 40 wt % and usable for the coating liquid for coating glass fibers according to the present invention is available from SUMITOMO SEIKA CHEMICALS CO., LTD. under the trade name of No. CSM-450. When a chlorosulfonated polyethylene (C) included in a coating liquid for coating glass fibers does not have the above-mentioned chlorine content and the sulfur content in sulfonic groups, a rubber-reinforcing glass fiber produced in such a manner that the coating liquid is applied to and dried on a glass fiber cord to form a coating layer on the glass fiber cord is inferior in adhesive strength to HNBR serving as the heat resistant rubber.

The coating liquid for coating glass fibers according to the present invention may contain an antioxidant, a pH adjuster and/or a stabilizer. Examples of the antioxidant and the pH adjuster are diphenylamine-based compounds and ammonia, respectively.

The rubber-reinforcing glass fiber according to the present invention has the coating layer formed by drying the coating liquid for coating glass fibers applied to the glass fiber, in which it is preferable to apply a second coating liquid for forming the second coating layer to the glass fiber. The second coating liquid is provided by dispersing the chlorosulfonated polyethylene (C) and bisallylnadiimide (F) in an organic solvent. A transmission belt formed such that a glass fiber cord coated with the second coating layer is embedded in a parent rubber and more particularly in a heat resistant rubber such as HNBR achieves an excellent adhesive strength between the glass fiber cord and the parent rubber. Thus, the glass fiber cord coated with the second coating layer according to the present invention serves as an effective reinforcing material for the transmission belt, and additionally an initial adhesive strength of the second coating layer can be maintained even after a long period of running of the transmission belt in hot and humid surroundings. Further, such a transmission belt has a good dimensional stability and therefore is excellent in heat resistance and water resistance. An example of the organic solvent is xylene.

The coating liquid for coating glass fibers according to the present invention is applied to the glass fiber cord and dried, thereby producing the rubber-reinforcing glass fiber. The coating liquid for coating glass fibers according to the present invention is obtained by mixing an alcohol compound (e.g. a glycol compound) or amine compound, the emulsion of the vinylpyridine-styrene-butadiene copolymer (B) and the emulsion of the chlorosulfonated polyethylene (C) with the chlorophenol-formaldehyde condensate (A). A first coating layer is formed by applying the coating liquid for coating glass fibers to the glass fiber cord and then drying it. Then, the second coating layer is formed by applying the second coating liquid to the glass fiber cord and drying it, thereby providing the rubber-reinforcing glass fiber of the present invention. The second coating liquid is obtained by dispersing bisallylnadiimide (F) and the chlorosulfonated polyethylene (C) in the organic solvent in such a manner as to have a composition where F/C is not less than 0.3% and not more than 10.0%. A transmission belt prepared by embedding the above-mentioned rubber-reinforcing glass fiber in HNBR according to the present invention can maintain its initial adhesive strength between the glass fiber and HNBR and its tensile strength even after a long period of running of the transmission belt in hot and humid surroundings, by virtue of the coating layer formed therebetween. Furthermore, the thus prepared transmission belt is excellent in dimensional stability and has both water resistance and heat resistance.

If the content of the bisallylnadiimide (F) represented by F/C is less than 0.3%, the heat resistance is not so good as the above. If F/C exceeds 10.0%, adhesive strength between the glass fiber cord and the parent rubber is low and therefore the produced transmission belt is inferior in durability.

Bisallylnadiimide is a kind of a thermosetting imide resin. Bisallylnadiimide of low molecular weight is superior in compatibility with other resins. Additionally, cured bisallylnadiimide has a glass transition point of 300° C. or higher, which provides the effect of improving heat resistance of the transmission belt.

Bisallylnadiimide is represented by a chemical formula [2] before being cured. An alkyl group of the chemical formula [2] is represented by a chemical formula [3] or [4], and is particularly preferably N—N=-hexamethylenediallylnadiimide.

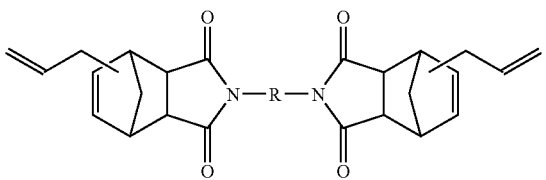

[2]

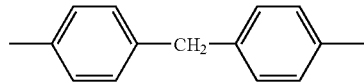

[3]

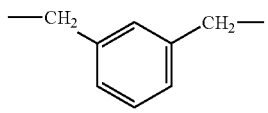

[4]

Bisallylnadiimide (F) is usable in the rubber-reinforcing glass fiber of the present invention and is commercially available from Maruzen Petrochemical Co., Ltd., for example, under the trade name of BANI-M, BANI-H or BANI-X.

The second coating layer may be other than that as discussed above, and more specifically, it may contain: maleimide; a triazine-based compound; or organic diisocyanate and zinc methacrylate in place of bisallylnadiimide (F).

In view of heat resistance of the transmission belt for reasons set forth above, and more specifically, when heat resistance is required for the transmission belt, however, it is particularly preferable to apply a coating liquid for coating glass fibers to form the second coating layer before embedding in the rubber, the coating liquid for coating glass fibers comprising an organic solvent in which the chlorosulfonated polyethylene (C) and the bisallylnadiimide (F) are dispersed.

In order to impart heat resistance to the rubber-reinforcing rubber of the present invention, it is preferable to use the chlorosulfonated polyethylene (C) as a component of the second coating layer. If a vulcanizing agent exemplified by nitroso compounds such as p-nitrosobenzene, and an inorganic filler such as carbon black and magnesium oxide are added to the second coating liquid for forming the second coating layer on the glass fiber and if the second coating layer is formed by using the same, the effect of further improving heat resistance of the transmission belt produced embedding the rubber-reinforcing rubber in rubber can be expected. If the vulcanizing agent is added in an amount of not less than 0.5% and not more than 20.0% while the inorganic filler are added in an amount of not less than 10.0% and not more than 70.0% relative to the weight of the chlorosulfonated polyethylene (C) contained in the second coating liquid for forming the second coating layer on the glass fiber, the transmission belt can exhibit a further heat resistance. Such an effect as to improve heat resistance cannot be exerted if the content of the vulcanizing agent is less than 0.5% or if the content of the inorganic filler is less than 10.0%. Additionally, the vulcanizing agent exceeding 20.0% in amount and the inorganic filler exceeding 70.0% in amount are not needed.

Thus, the rubber-reinforcing glass fiber according to the present invention exhibits an improved heat resistance as compared to the conventional rubber-reinforcing glass fiber, when embedded in a heat resistant rubber such as HNBR to be the transmission belt. With this, the transmission belt obtains heat resistance, and therefore excellently exhibits both water resistance and heat resistance.

The transmission belt as discussed in the present invention is a belt for transmitting driving force from driving sources such as an engine and a motor to operate mechanical devices such as an engine. Examples of the transmission belt are: a toothed belt which can transmit the driving force by engagement transmission; and a V-belt which can transmit the driving force by frictional transmission.

Furthermore, an automotive transmission belt is a heat resistant transmission belt used in an automotive engine compartment.

The timing belt is the automotive transmission belt who has teeth for transmitting rotation of a crankshaft to a timing gear in an engine including a camshaft in order to drive a camshaft. The teeth are able to engage with teeth of a pulley, with which a valve can be moved between opened and closed positions at a certain timing. It is required for the automotive transmission belt to have heat resistance against heat of the engine, and water resistance against running in rain. Additionally, the automotive transmission belt is required to maintain tensile strength even after a long period of running in the presence of both heat and humidity and to have an excellent dimensional stability. More specifically, it is required to be superior in heat resistance and water resistance. According to the present invention, the coating liquid for coating glass fibers, the rubber-reinforcing glass fiber formed by applying the coating liquid for coating glass fibers to the glass fiber cord, and the transmission belt formed by embedding the rubber-reinforcing glass fiber in the heat resistant rubber which transmission belt is exemplified by the timing belt formed by embedding the rubber-reinforcing glass fiber in HNBR are excellent in heat resistance and water resistance.

EXAMPLES

In Examples 1 to 4 as will be discussed below, a chlorophenol (D) and formaldehyde (E) were condensed in water to prepare a reaction solution in which a precipitate of a chlorophenol-formaldehyde condensate (A) was made. Then, an alcohol compound was added to the reaction solution to dissolve the precipitate, thereby preparing an aqueous solution of the chlorophenol-formaldehyde condensate (A). Then, an emulsion of a vinylpyridine-styrene-butadiene copolymer (B) and an emulsion of a chlorosulfonated polyethylene (C) were mixed into the aqueous solution of the chlorophenol-formaldehyde condensate (A), thereby obtaining the present invention's coating liquid for coating glass fibers. The coating liquid was applied to a glass fiber cord and then dried. Thereafter, a second coating liquid for coating glass fibers was applied to the glass fiber cord to form a second coating layer thereon thereby producing a rubber-reinforcing glass fiber, the second coating liquid being prepared by dispersing the chlorosulfonated polyethylene (C) and bisallylnadiimide (F) in an organic solvent.

In Examples 5 to 8, a procedure as discussed in Examples 1 to 4 was repeated with the exception that the alcohol compound was replaced with an amine compound.

Meanwhile, a rubber-reinforcing glass fiber not in accordance with the present invention was prepared in Comparative Examples 1 and 2. Then, an evaluation of adhesive strength to the heat resistant rubber was conducted on each rubber-reinforcing glass fiber in accordance with the present invention (Examples 1 to 8) and each rubber-reinforcing glass fiber not in accordance with the present invention (Comparative Examples 1 and 2), and results thereof were compared with each other.

Further, a transmission belt was produced by embedding either the rubber-reinforcing glass fiber in accordance with the present invention or that not in accordance with the present invention in the heat resistant rubber. In order to evaluate water resistance, the transmission belt was fixed to a pulley and then run for a long period of time with water sprinkled on the transmission belt. More specifically, an evaluation of a running fatigue performance with water resistance was conducted on the transmission belt embedding the rubber-reinforcing glass fiber in accordance with the present invention therein (Examples 1 to 8) and on that embedding the rubber-reinforcing glass fiber not in accordance with the present invention therein (Comparative Examples 1 and 2), in order to evaluate whether or not the coating layer maintained its initial adhesive strength so as to maintain tensile strength even after a long period of running and so as to provide an excellent dimensional stability. A result of the evaluation was compared with others.

Meanwhile, the transmission was run under high temperature for a long period of time with a plurality of pulleys, thereby being evaluated in terms of heat resistance. More specifically, an evaluation of a heat-resistance and flexion-resistance running fatigue performance was conducted on the transmission belt embedding the rubber-reinforcing glass fiber in accordance with the present invention therein (Examples 2, 4, 6 and 8) and on that embedding the rubber-reinforcing glass fiber not in accordance with the present invention therein (Comparative Examples 1 and 2), in order to evaluate whether or not the coating layer maintained its initial adhesive strength so as to maintain tensile strength even after a long period of running and so as to provide an excellent dimensional stability. A result of the evaluation was compared with others.

The present invention will be more readily understood with reference to the following Examples; however, these Examples are intended to illustrate the invention and are not to be construed to limit the scope of the invention.

Example 1

Preparation of Present Invention's Coating Liquid for Coating Glass Fibers

First of all, the synthesis of a chlorophenol-formaldehyde condensate (A) will be discussed. A three-neck separable flask having a reflux condenser, a temperature gauge and a stirrer was charged with 128 parts by weight of a chlorophenol (D), 80 parts by weight of an aqueous solution of formaldehyde (E) (concentration: 37 wt %, mole ratio: E/D=1.0), and 20 parts by weight of sodium hydroxide (concentration: 1 wt %). Thereafter, these components were diluted with water to be 1000 parts by weight and then stirred for 5 hours at a temperature of 80° C., thereby obtaining a reaction solution. Polymerization was made in the reaction solution so that the chlorophenol-formaldehyde condensate (A) was precipitated therein. Then, 2-methoxyethanol belonging to glycol compounds was added to 100 parts by weight of the reaction solution so as to dissolve the precipitate of the chlorophenol-formaldehyde condensate (A), thereby preparing an aqueous solution of the chlorophenol-formaldehyde condensate (A).

The added amount of 2-methoxyethanol was 200.0 wt % based on the weight of the chlorophenol-formaldehyde condensate (A) (100 wt %). In other words, 2-methoxyethanol was added to be two times as large as the chlorophenol-formaldehyde condensate (A) by weight.

The sodium hydroxide (concentration: 1 wt %) was added as a catalyst for condensing the chlorophenol (D) and formaldehyde (E) and for forming the precipitate of the chlorophenol-formaldehyde condensate (A), and the added amount thereof was less than that needed for condensation reaction. As the chlorophenol (D), para-chlorophenol was used.

Subsequently, aqueous ammonia and water were added to an emulsion of a commercially available vinylpyridine-styrene-butadiene copolymer (B) and an emulsion of a chlorosulfonated polyethylene (C) by using the aqueous solution of the chlorophenol-formaldehyde condensate (A) synthesized in the above-mentioned procedure, thereby preparing a coating liquid for coating glass fibers according to the present invention.

More specifically, 476 parts by weight of the emulsion of the vinylpyridine-styrene-butadiene copolymer (B) available from NIPPON A&L INC. under the trade name of PYRATEX (vinylpyridine:styrene:butadiene=15 wt %:15 wt %:70 wt %; solid content; 41.0 wt %); 206 parts by weight of the emulsion of the chlorosulfonated polyethylene (C) available from SUMITOMO SEIKA CHEMICALS CO., LTD. under the trade name of No. CSM450 (solid content: 40.0 wt %); and 22 parts by weight of the aqueous ammonia (concentration: 25.0 wt %) serving as a pH adjuster were added to 42 parts by weight of the aqueous solution in which the chlorophenol-formaldehyde condensate (A) was dissolved with the addition of 2-methoxyethanol, followed by dilution with water thereby preparing 1000 parts by weight of the coating liquid for coating glass fibers according to the present invention.

The content percentages of the chlorophenol-formaldehyde condensate (A), the vinylpyridine-styrene-butadiene copolymer (B) and the chlorosulfonated polyethylene (C) were A/(A+B+C)=3.6%, B/(A+B+C)=67.8% and C/(A+B+C)=28.6%, respectively, based on 100% of the total weight of the chlorophenol-formaldehyde condensate (A), the vinylpyridine-styrene-butadiene copolymer (B) and the chlorosulfonated polyethylene (C) in the coating liquid for coating glass fibers.

The weights of the vinylpyridine-styrene-butadiene copolymer (B) and the chlorosulfonated polyethylene (C) contained in the coating liquid for coating glass fibers were determined by converting the above-mentioned solid contents of PYRATEX and CSM450 into the weight units.

[Production of Rubber Reinforcing Glass Fiber]

Then, the chlorosulfonated polyethylene (C), p-dinitrobenzene and hexamethylenediallylnadiimide belonging to bisallylnadiimide were mixed into carbon black and dispersed in xylene, thereby preparing a second coating liquid for forming a second coating layer on a rubber-reinforcing glass fiber of the present invention.

More specifically, 100 parts by weight of TS-430 available as the chlorosulfonated polyethylene (C) from TOSOH CORPORATION, 40 parts by weight of p-dinitrobenzene and 0.3 parts by weight of BANI-H available from Maruzen Petrochemical Co., Ltd. as N—N≡-hexamethylenediallylnadiimide were mixed into 30 parts by weight of carbon black and then dispersed in 1315 parts by weight of xylene, thereby preparing the second coating liquid for coating glass fibers with the second coating layer.

Three glass fiber cords, each of which had 200 glass fiber filaments of 9 μm in diameter, were aligned with one another. The above-prepared coating liquid for coating glass fibers was applied to the glass fiber cords and dried for 22 seconds at a temperature of 280° C. to form a coating layer on the glass fiber cords.

The solid matter adhesion rate, i.e., the weight percentage of the coating layer was 19.0 wt % relative to the total weight of glass fiber cords covered with the coating layer.

The coated glass fiber cords were then subjected to two times of initial twist per 2.54 cm in one direction to provide a strand of the coated glass fiber cords. Thirteen strands of the coated glass fiber cords were provided in total and subjected to two times of final twist per 2.54 cm in the opposite direction. The above-prepared second coating liquid was applied to the stranded glass fiber cords and dried for 1 minute at a temperature of 110° C. to form the second coating layer, thereby obtaining the rubber-reinforcing glass fiber according to the present invention (Example 1). In this way, two types of the rubber-reinforcing glass fibers having opposite initial and final twist directions (referred to S-twist and Z-twist fibers) were produced.

The solid matter adhesion rate, i.e., the weight percentage of the second coating layer was 3.5 wt % relative to the total weight of glass fiber cords covered with the first and second coating layers.

Example 2

A coating liquid for coating glass fibers, according to the present invention was obtained by repeating a procedure of Example 1 with the exception that the amounts of the chlorophenol-formaldehyde condensate (A) and the emulsion of the vinylpyridine-styrene-butadiene copolymer (B) (available from NIPPON A&L INC. under the trade name of PYRATEX) (vinylpyridine:styrene:butadiene=15 wt %:15 wt %:70 wt %; solid content: 41.0 wt %) were changed into 83 and 451 parts by weight, respectively.

More specifically, the content percentages of the chlorophenol-formaldehyde condensate (A), the vinylpyridine-styrene-butadiene copolymer (B) and the chlorosulfonated polyethylene (C) were A/(A+B+C)=7.2%, B/(A+B+C)=64.2% and C/(A+B+C)=28.6%, respectively, based on 100% of the total weight of the chlorophenol-formaldehyde condensate (A), the vinylpyridine-styrene-butadiene copolymer (B) and the chlorosulfonated polyethylene (C) in the coating liquid for coating glass fibers.

These content percentages were kept even after the coating layer was formed on the rubber-reinforcing glass fiber.

Then, the second coating liquid for coating glass fibers, according to Example 1 was prepared by a procedure of Example 1, and the glass fiber cords were produced by a procedure of Example 1. The second coating liquid was applied to the glass fiber cords to form the second coating layer, thereby obtaining a rubber-reinforcing glass fiber of the present invention (Example 2).

Example 3

A coating liquid for coating glass fibers, according to the present invention was obtained by repeating a procedure of Example 1 with the exception that the amounts of the chlorophenol-formaldehyde condensate (A) and the emulsion of the vinylpyridine-styrene-butadiene copolymer (B) (available from NIPPON A&L INC. under the trade name of PYRATEX) (vinylpyridine:styrene:butadiene=15 wt %:15 wt %:70 wt %; solid content: 41.0 wt %) were changed into 124 and 426 parts by weight, respectively.

More specifically, the content percentages of the chlorophenol-formaldehyde condensate (A), the vinylpyridine-styrene-butadiene copolymer (B) and the chlorosulfonated polyethylene (C) were A/(A+B+C)=10.8%, B/(A+B+C)=60.6% and C/(A+B+C)=28.6%, respectively, based on 100% of the total weight of the chlorophenol-formaldehyde condensate (A), the vinylpyridine-styrene-butadiene copolymer (B) and the chlorosulfonated polyethylene (C) in the coating liquid for coating glass fibers.

Then, the second coating liquid for coating glass fibers, according to Example 1 was prepared by a procedure of Example 1, and the glass fiber cords were produced by a procedure of Example 1. The second coating liquid was applied to the glass fiber cords to form the second coating layer, thereby obtaining a rubber-reinforcing glass fiber of the present invention (Example 3).

Example 4

A three-neck separable flask having a reflux condenser, a temperature gauge and a stirrer was charged with 128 parts by weight of a chlorophenol (D), 80 parts by weight of an aqueous solution of formaldehyde (E) (concentration: 37 wt %, mole ratio: E/D=1.0), and 20 parts by weight of sodium hydroxide (concentration: 1 wt %). Thereafter, these components were diluted with water to be 1000 parts by weight and then stirred for 5 hours at a temperature of 80° C., thereby obtaining a reaction solution. Polymerization was made in the reaction solution so that the chlorophenol-formaldehyde condensate (A) was precipitated therein. Then, propylene glycol belonging to glycol compounds was added to 100 parts by weight of the reaction solution so as to dissolve the precipitate of the chlorophenol-formaldehyde condensate (A), thereby preparing an aqueous solution of the chlorophenol-formaldehyde condensate (A). The added amount of propylene glycol was 200.0 wt % based on the weight of the chlorophenol-formaldehyde condensate (A). In other words, propylene glycol was added to be two times as large as the chlorophenol-formaldehyde condensate (A) by weight.

The sodium hydroxide (concentration: 1 wt %) was added as a catalyst for condensing the chlorophenol (D) and formaldehyde (E) and for forming the precipitate of the chlorophenol-formaldehyde condensate (A), and the added amount thereof was less than that needed for condensation reaction. As the chlorophenol (D), para-chlorophenol was used.

Subsequently, aqueous ammonia and water were added to an emulsion of a commercially available vinylpyridine-styrene-butadiene copolymer (B) and an emulsion of a chlorosulfonated polyethylene (C) by using the aqueous solution of the chlorophenol-formaldehyde condensate (A) synthesized in the above-mentioned procedure, thereby preparing a coating liquid for coating glass fibers according to the present invention.

A coating liquid for coating glass fibers, according to the present invention was obtained by repeating a procedure of Example 1 with the exception that the amounts of the above prepared chlorophenol-formaldehyde condensate (A) and the emulsion of the vinylpyridine-styrene-butadiene copolymer (B) (available from NIPPON A&L INC. under the trade name of PYRATEX) (vinylpyridine:styrene:butadiene=15 wt %:15 wt %:70 wt %; solid content: 41.0 wt %) were changed into 83 and 451 parts by weight, respectively.

More specifically, the content percentages of the chlorophenol-formaldehyde condensate (A), the vinylpyridine-styrene-butadiene copolymer (B) and the chlorosulfonated polyethylene (C) were A/(A+B+C)=7.2%, B/(A+B+C)=64.2% and C/(A+B+C)=28.6%, respectively, based on 100% of the total weight of the chlorophenol-formaldehyde condensate (A), the vinylpyridine-styrene-butadiene copolymer (B) and the chlorosulfonated polyethylene (C) in the coating liquid for coating glass fibers.

Then, the second coating liquid for coating glass fibers, according to Example 1 was prepared by a procedure of Example 1, and the glass fiber cords were produced by a procedure of Example 1. The second coating liquid was applied to the glass fiber cords to form the second coating layer, thereby obtaining a rubber-reinforcing glass fiber of the present invention (Example 4).

Example 5

Preparation of Present Invention's Coating Liquid for Coating Glass Fibers

First of all, the synthesis of a chlorophenol-formaldehyde condensate (A) will be discussed. A three-neck separable flask having a reflux condenser, a temperature gauge and a stirrer was charged with 128 parts by weight of a chlorophenol (D), 80 parts by weight of an aqueous solution of formaldehyde (E) (concentration: 37 wt %, mole ratio: E/D=1.0), and 20 parts by weight of sodium hydroxide (concentration: 1 wt %). Thereafter, these components were diluted with water to be 1000 parts by weight and then stirred for 5 hours at a temperature of 80° C., thereby obtaining a reaction solution. Polymerization was made in the reaction solution so that the chlorophenol-formaldehyde condensate (A) was precipitated therein. Then, dimethylamine was added to 100 parts by weight of the reaction solution so as to dissolve the precipitate of the chlorophenol-formaldehyde condensate (A), thereby preparing an aqueous solution of the chlorophenol-formaldehyde condensate (A). The basicity constant (Kb) dimethylamine has is $5.4 \times 10^{-4}$. The added amount of dimethylamine was 200.0 wt % based on 100% of the weight of the chlorophenol-formaldehyde condensate (A). In other words, dimethylamine was added to be two times as large as the chlorophenol-formaldehyde condensate (A) by weight.

The sodium hydroxide (concentration: 1 wt %) was added as a catalyst for condensing the chlorophenol and formaldehyde and for forming the precipitate of the chlorophenol-formaldehyde condensate, and the added amount thereof was less than that needed for condensation reaction.

As the chlorophenol (D), para-chlorophenol was used.

Subsequently, aqueous ammonia and water were added to an emulsion of a commercially available vinylpyridine-styrene-butadiene copolymer (B) and an emulsion of a chlorosulfonated polyethylene (C) by using the aqueous solution of the chlorophenol-formaldehyde condensate (A) synthesized in the above-mentioned procedure, thereby preparing a coating liquid for coating glass fibers according to the present invention.

More specifically, 476 parts by weight of the emulsion of the vinylpyridine-styrene-butadiene copolymer (B) available from NIPPON A&L INC. under the trade name of PYRATEX (vinylpyridine:styrene:butadiene=15 wt %:15 wt %:70 wt %; solid content: 41.0 wt %); 206 parts by weight of the emulsion of the chlorosulfonated polyethylene (C) available from SUMITOMO SEIKA CHEMICALS CO., LTD. under the trade name of No. CSM450 (solid content: 40.0 wt %); and 22 parts by weight of the aqueous ammonia (concentration: 25.0 wt %) serving as a pH adjuster were added to 42 parts by weight of the aqueous solution in which the chlorophenol-formaldehyde condensate (A) was dissolved with the addition of 2-methoxyethanol, followed by dilution with water thereby preparing 1000 parts by weight of the coating liquid for coating glass fibers according to the present invention.

The content percentages of the chlorophenol-formaldehyde condensate (A), the vinylpyridine-styrene-butadiene copolymer (B) and the chlorosulfonated polyethylene (C)

were A/(A+B+C)=3.6%, B/(A+B+C)=67.8% and C/(A+B+C)=28.6%, respectively, based on 100% of the total weight of the chlorophenol-formaldehyde condensate (A), the vinylpyridine-styrene-butadiene copolymer (B) and the chlorosulfonated polyethylene (C) in the coating liquid for coating glass fibers.

The weights of the vinylpyridine-styrene-butadiene copolymer (B) and the chlorosulfonated polyethylene (C) contained in the coating liquid for coating glass fibers were determined by converting the above-mentioned solid contents of PYRATEX and CSM450 into the weight units.

[Production of Rubber-Reinforcing Glass Fiber]

A procedure of Example 1 was repeated to produce a rubber-reinforcing glass fiber.

The solid matter adhesion rate, i.e., the weight percentage of the second coating layer was 3.5 wt % relative to the total weight of glass fiber cords covered with the first and second coating layers.

Example 6

A coating liquid for coating glass fibers, according to the present invention was obtained by repeating a procedure of Example 5 with the exception that the amounts of the chlorophenol-formaldehyde condensate (A) and the emulsion of the vinylpyridine-styrene-butadiene copolymer (B) (available from NIPPON A&L INC. under the trade name of PYRATEX) (vinylpyridine:styrene:butadiene=15 wt %:15 wt %:70 wt %; solid content: 41.0 wt %) were changed into 83 and 451 parts by weight, respectively.

More specifically, the content percentages of the chlorophenol-formaldehyde condensate (A), the vinylpyridine-styrene-butadiene copolymer (B) and the chlorosulfonated polyethylene (C) were A/(A+B+C)=7.2%, B/(A+B+C)=64.2% and C/(A+B+C)=28.6%, respectively, based on 100% of the total weight of the chlorophenol-formaldehyde condensate (A), the vinylpyridine-styrene-butadiene copolymer (B) and the chlorosulfonated polyethylene (C) in the coating liquid for coating glass fibers.

Then, the second coating liquid for coating glass fibers, according to Example 5 was prepared by a procedure of Example 5, and the glass fiber cords were produced by the procedure of Example 5. The second coating liquid was applied to the glass fiber cords to form the second coating layer, thereby obtaining a rubber-reinforcing glass fiber of the present invention (Example 6).

Example 7

A coating liquid for coating glass fibers, according to the present invention was obtained by repeating a procedure of Example 5 with the exception that the amounts of the chlorophenol-formaldehyde condensate (A) and the emulsion of the vinylpyridine-styrene-butadiene copolymer (B) (available from NIPPON A&L INC. under the trade name of PYRATEX) (vinylpyridine:styrene:butadiene=15 wt %:15 wt %:70 wt %; solid content: 41.0 wt %) were changed into 124 and 426 parts by weight, respectively.

More specifically, the content percentages of the chlorophenol-formaldehyde condensate (A), the vinylpyridine-styrene-butadiene copolymer (B) and the chlorosulfonated polyethylene (C) were A/(A+B+C)=10.8%, B/(A+B+C)=60.6% and C/(A+B+C)=28.6%, respectively, based on 100% of the total weight of the chlorophenol-formaldehyde condensate (A), the vinylpyridine-styrene-butadiene copolymer (B) and the chlorosulfonated polyethylene (C) in the coating liquid for coating glass fibers.

Then, the second coating liquid for coating glass fibers, according to Example 5 was prepared by a procedure of Example 5, and the glass fiber cords were produced by the procedure of Example 5. The second coating liquid was applied to the glass fiber cords to form the second coating layer, thereby obtaining a rubber-reinforcing glass fiber of the present invention (Example 6).

Example 8

A three-neck separable flask having a reflux condenser, a temperature gauge and a stirrer was charged with 128 parts by weight of a chlorophenol (D), 80 parts by weight of an aqueous solution of formaldehyde (E) (concentration: 37 wt %, mole ratio: E/D=1.0), and 20 parts by weight of sodium hydroxide (concentration: 1 wt %). Thereafter, these components were diluted with water to be 1000 parts by weight and then stirred for 5 hours at a temperature of 80° C., thereby obtaining a reaction solution. Polymerization was made in the reaction solution so that the chlorophenol-formaldehyde condensate (A) was precipitated therein. Then, diethanolamine was added to 100 parts by weight of the reaction solution so as to dissolve the precipitate of the chlorophenol-formaldehyde condensate (A), thereby preparing an aqueous solution of the chlorophenol-formaldehyde condensate (A). The basicity constant (Kb) diethanolamine has is $1.0 \times 10^{-4.5}$. The added amount of diethanolamine was 200.0 wt % based on 100% of the weight of the chlorophenol-formaldehyde condensate (A). In other words, diethanolamine was added to be two times as large as the chlorophenol-formaldehyde condensate (A) by weight.

The sodium hydroxide (concentration: 1 wt %) was added as a catalyst for condensing the chlorophenol and formaldehyde and for forming the precipitate of the chlorophenol-formaldehyde condensate, and the added amount thereof was less than that needed for condensation reaction. As the chlorophenol (D), para-chlorophenol was used.

A procedure of Example 5 was repeated with the exception that the precipitate formed of the chlorophenol-formaldehyde condensate (A) was dissolved with the addition of diethanolamine, thereby preparing a solution of the chlorophenol-formaldehyde condensate (A).

A coating liquid for coating glass fibers, according to the present invention was obtained by repeating a procedure of Example 5 with the exception that the amounts of the chlorophenol-formaldehyde condensate (A) and the emulsion of the vinylpyridine-styrene-butadiene copolymer (B) (available from NIPPON A&L INC. under the trade name of PYRATEX) (vinylpyridine:styrene:butadiene=15 wt %:15 wt %:70 wt %; solid content: 41.0 wt %) were changed into 83 and 451 parts by weight, respectively.

More specifically, the content percentages of the chlorophenol-formaldehyde condensate (A), the vinylpyridine-styrene-butadiene copolymer (B) and the chlorosulfonated polyethylene (C) were A/(A+B+C)=7.2%, B/(A+B+C)=64.2% and C/(A+B+C)=28.6%, respectively, based on 100% of the total weight of the chlorophenol-formaldehyde condensate (A), the vinylpyridine-styrene-butadiene copolymer (B) and the chlorosulfonated polyethylene (C) in the coating liquid for coating glass fibers.

Then, the second coating liquid for coating glass fibers, according to Example 5 was prepared by a procedure of Example 5. The second coating liquid was applied to the glass fiber cords by the procedure of Example 1 to form the second coating layer, thereby obtaining a rubber-reinforcing glass fiber of the present invention.

Comparative Example 1

A coating liquid for coating a rubber-reinforcing glass fiber was prepared to include a conventional resorcinol-formaldehyde condensate, the vinylpyridine-styrene-butadiene copolymer (B) and the chlorosulfonated polyethylene (C).

A coating liquid for coating glass fibers was prepared by a procedure of Example 1 and a conventional coating liquid for coating glass fibers was prepared by a procedure of Example 1 with the exception that the chlorophenol-formaldehyde condensate (A) was replaced with 239 parts by weight of a resorcinol-formaldehyde condensate (obtained by reacting resorcin and formaldehyde at a mole ratio of 1.0:1.0 and having a solid content of 8.7 wt %) and that the amount of the emulsion of the vinylpyridine-styrene-butadiene copolymer (B) (available from NIPPON A&L INC. under the trade name of PYRATEX) (vinylpyridine:styrene:butadiene=15 wt %:15 wt %:70 wt %; solid content: 41.0 wt %) was changed into 451 parts by weight. More specifically, the content percentages of the resorcinol-formaldehyde condensate, the vinylpyridine-styrene-butadiene copolymer and the chlorosulfonated polyethylene were 7.2%, 64.2% and 28.6%, respectively, based on 100% of the total weight of the resorcinol-formaldehyde condensate, the vinylpyridine-styrene-butadiene copolymer and the chlorosulfonated polyethylene in the coating liquid for coating glass fibers.

Then, the second coating liquid for coating glass fibers, according to Example 1 was prepared by a procedure of Example 1 and applied to glass fiber cords by a procedure of Example 1 to form the second coating layer, thereby obtaining a rubber-reinforcing glass fiber.

Comparative Example 2

A first coating layer was formed by using the same coating liquid as that in Example 1 with the exception that the precipitate of the chlorophenol-formaldehyde condensate (A) was dissolved by sodium hydroxide. Then, the same second coating liquid as that in Example 1 was prepared and a second coating layer was formed on the glass fiber cords through a procedure of Example 1, thereby producing a rubber-reinforcing glass fiber.

Comparative Example 3

A coating layer for coating glass fibers was prepared in the same manner as in Example 1 with the exception that the precipitate of the chlorophenol-formaldehyde condensate (A) was dissolved by ammonia. However, it could not be applied because of precipitation of the chlorophenol-formaldehyde condensate (A).

[Adhesive Strength Evaluation]

Previous to discussing an adhesive strength evaluation, heat resistant rubbers used in the evaluation will be discussed.

In the adhesive strength evaluation test, a heat resistant rubber (hereinafter referred to as a heat resistant rubber A) formed of cross-linked HNBR and prepared from 100 parts by weight of HNBR (available from Zeon Corporation under the trade name of 2020) as a parent rubber, 40 parts by weight of carbon black, 5 parts by weight of hydrozincite, 0.5 parts by weight of stearic acid, 0.4 parts by weight of sulfur, 2.5 parts by weight of a vulcanization accelerator and 1.5 parts by weight of an antioxidant, or a heat resistant rubber (hereinafter referred to as a heat resistant rubber B) formed of cross-linked HNBR and prepared from 100 parts by weight of HNBR (available under the trade name of 2010 from Zeon Corporation) as a parent rubber, 40 parts by weight of carbon black, 5 parts by weight of hydrozincite, 0.5 parts by weight of stearic acid, 5 parts by weight of 1,3-di(t-buthylperoxyisopropyl)benzene and 1.5 parts by weight of an antioxidant was used.

A rubber sheet formed of the heat resistant rubber A and that formed of the heat resistant rubber B were prepared such that either of them had 3 mm in thickness and 25 mm in width. Twenty pieces of the rubber-reinforcing glass fiber cords (Examples 1-8 and Comparative Examples 1 and 2) were placed on each of the rubber sheets and covered with cloths, followed by pressing the rubber sheets except their edges with 196 N/cm$^2$ at a temperature of 150° C. in the case of the heat resistant rubber A, and with 196 N/cm$^2$ at a temperature of 170° C. in the case of the heat resistant rubber B. The rubber sheets were thus subjected to vulcanization forming for 30 minute, thereby obtaining test samples or rubber sheets for the adhesive strength evaluation. The adhesive strength of each of the test samples was evaluated by clamping the edge of the test sample and the rubber-reinforcing glass fiber independently, peeling the rubber-reinforcing glass fiber from the rubber sheet at a peel speed of 50 mm/min and determining the maximum resistance of the rubber-reinforcing glass fiber to peeling from the rubber sheet. Herein, higher peel strength means better adhesive strength.

[Result of Adhesive Strength Evaluation]

A result of the adhesive strength evaluation is shown in Table 1.

TABLE 1

| | Adhesive Property | | | |
|---|---|---|---|---|
| | Heat Resistant Rubber A | | Heat Resistant Rubber B | |
| | Adhesive Strength (N) | Peeling Condition | Adhesive Strength (N) | Peeling Condition |
| Example 1 | 340 | Rubber Fracture | 295 | Rubber Fracture |
| Example 2 | 352 | Rubber Fracture | 337 | Rubber Fracture |
| Example 3 | 345 | Rubber Fracture | 322 | Rubber Fracture |
| Example 4 | 318 | Rubber Fracture | 305 | Rubber Fracture |
| Example 5 | 318 | Rubber Fracture | 284 | Rubber Fracture |
| Example 6 | 321 | Rubber Fracture | 317 | Rubber Fracture |
| Example 7 | 325 | Rubber Fracture | 302 | Rubber Fracture |
| Example 8 | 343 | Rubber Fracture | 345 | Rubber Fracture |
| Comparative Example 1 | 323 | Rubber Fracture | 314 | Rubber Fracture |
| Comparative Example 2 | 315 | Rubber Fracture | 312 | Rubber Fracture |

In Table 1, the fracture condition of the test sample under which there was no interfacial separation between the glass fiber and the rubber is referred to as "rubber fracture" and the fracture condition of the test sample under which there was separation in at least part of the interface between the glass fiber and the rubber is referred to as "interface fracture". The rubber fracture means higher adhesive strength than interfacial fracture.

All of the rubber-reinforcing glass fibers of Examples 1 to 8 according to the present invention and the rubber-reinforcing glass fibers of Comparative Examples 1 and 2 not according to the present invention were measured in terms of peel strength, as shown in Table 1, and exhibited good adhesive property against either of the heat resistant rubbers A and B and good adhesive strength.

Concerning the fracture condition, all of the rubber-reinforcing glass fibers of Examples 1 to 8 and Comparative Examples 1 and 2 exhibited the rubber fracture in either of the cases of the heat resistant rubber A and the heat resistant rubber B, as shown in Table 1, and had an excellent adhesive strength.

[Water Resistance Evaluation]

A transmission belt having a width of 19 mm and a length of 876 mm was produced by using the rubber-reinforcing glass fibers produced in each of Examples 1, 2, 4, 5, 6 and 8 and Comparative Examples 1 and 2 as reinforcements and the heat resistant rubber B as a parent rubber, and then a water-resistance running fatigue test was conducted thereon in order to evaluate water resistance. The water resistance of the transmission belt was evaluated in terms of a tensile strength maintenance, i.e., a water-resistance running fatigue as measured after running the transmission belt on a gearwheel i.e. a pulley under wet conditions for a certain period of time.

FIG. 1 is a perspective sectional view of the transmission belt produced by embedding rubber-reinforcing glass fibers in the heat resistant rubber.

A transmission belt 1 had a plurality of projections 1A of 3.2 mm height for engagement with the pulley, a base portion 1B of 2.0 mm thickness excluding the height of the projections 1A. Twelve rubber-reinforcing glass fibers 2 with six S-twist fibers and six Z-twist fibers of opposite initial and final twist directions were embedded alternately in the base portion 1B as shown by the section of FIG. 1.

Figure 2:
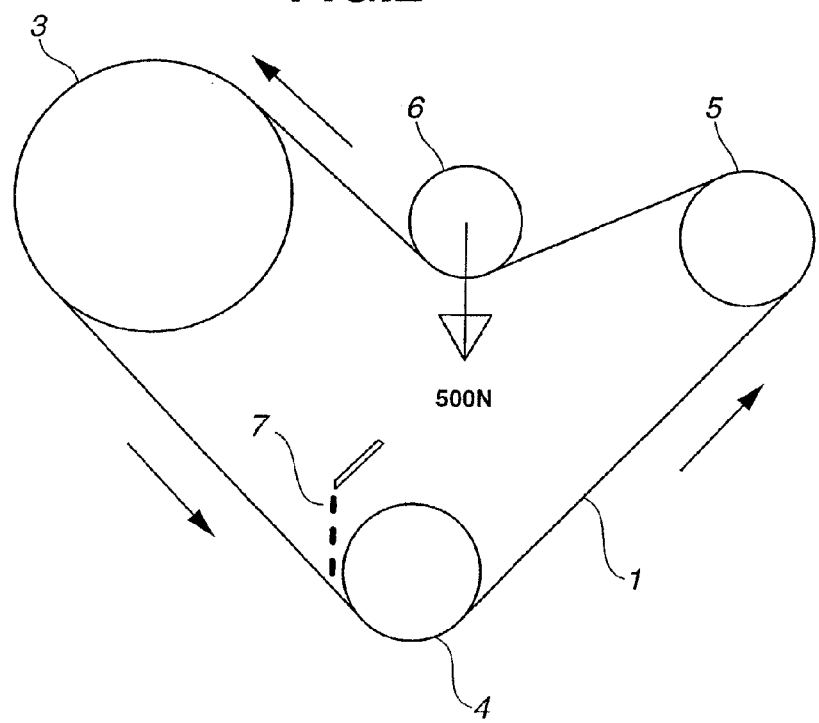
FIG. 2 is a schematic view of a water-resistance running fatigue tester for the transmission belt.

FIG. 2 is a schematic view of a water-resistance running fatigue tester for the transmission belt.

The water resistance was tested in such a manner as to set the transmission belt 1 of each example in the water-resistance running fatigue tester having a drive motor and a generator (which are not shown in the drawings), as shown in FIG. 2.

The transmission belt 1 was run by driving force of a drive pulley 3 rotated and driven by a drive motor, while rotating driven pulleys 4 and 5. The driven pulley 5 was connected to a generator (not shown) to drive the generator in such a manner as to produce 1 kw of power. An idler 6 was rotated during the water-resistance running fatigue test to apply a load of 500 N to the transmission belt 1 thereby holding the transmission belt 1 under tension. The drive pulleys 4 and 5 3 had a diameter of 60 mm and 20 teeth (T), while the drive pulley 3 had a diameter of 120 mm and 40 teeth (T). The rotation rate of the drive pulley 3 per minute in the water-resistance running fatigue test was 3000 rpm, and the rotation rate of the driven pulleys 4 and 5 per minute was 6000 rpm. The rotational direction is indicated in the drawings by arrows parallel with the transmission belt 1.

As shown in FIG. 2, the transmission belt 1 was run with the driven pulleys 4 and 5 and the idler 6 at room temperature by rotating the drive pulley 3 at 3000 rpm and dropping 6000 ml of water 7 per hour uniformly onto the transmission belt 1 at a location between the drive pulley 3 and the driven pulley 4. In the water-resistance running fatigue test, the transmission belt 1 was run for 36 hours as explained above. The tensile strength of the transmission belt 1 was measured before and after the water-resistance running fatigue test to determine the tensile strength maintenance of the transmission belt 1 before and after the test by applying the following mathematical expression 1. Then, the water resistance of the transmission belts 1 provided with the rubber-reinforcing glass fibers 2 of Examples 1, 2, 4, 5, 6 and 8 and Comparative Examples 1 and 2 were compared and evaluated.

[Tensile Strength Measurement]

For a tensile strength measurement, three test samples of 257 mm length were cut from a single transmission belt. Each of the test samples was held at its edges by clamps with a clamp-to-clamp distance of 145 mm and pulled at a 50 mm/min, thereby measuring the maximum resistance of the belt to breaking. The resistance was measured three times on each belt. The average of measured resistance values was determined as the tensile strength of the transmission belt. The tensile strength of the transmission belt before the test was determined by measuring the tensile strength three times on each of ten belts produced in the same manner and setting the initial value to the average of the measured tensile strength values.

The tensile strength maintenance was determined from the mathematical expression 1.

The tensile strength maintenance(%)=the tensile strength after the test÷the tensile strength before the test×100    [Mathematical Expression 1]

The tensile strength maintenance of each transmission belt after the water-resistance running fatigue test is shown in Table 2.

TABLE 2

| | Example 1 | Example 2 | Example 4 | Example 5 | Example 6 | Example 8 | Comparative Example 1 | Comparative Example 2 |
|---|---|---|---|---|---|---|---|---|
| Tensile Strength Maintenance (%) | 70 | 68 | 65 | 67 | 62 | 68 | 47 | Broken in the course of running |

It is confirmed from results of the water-resistance running fatigue test that the transmission belt 1 provided with the rubber-reinforcing glass fibers 2 of the present invention had an excellent water resistance as compared with the rubber-reinforcing glass fibers 2 of Comparative Examples 1 and 2, the rubber-reinforcing glass fibers 2 of the present invention including: the coating layer formed by drying the coating liquid for coating glass fibers according to the present invention comprising the chlorophenol-formaldehyde condensate (A), the vinylpyridine-styrene-butadiene copolymer (B) and the chlorosulfonated polyethylene (C) after application thereof; and the second coating layer comprising the chlorosulfonated polyethylene (C), p-dinitrobenzene and hexamethylenediallylnadiimide belonging to bisallylnadiimide.

[Heat Resistance Evaluation]

A transmission belt having a width of 19 mm and a length of 876 mm was produced by using the rubber-reinforcing glass fibers 2 produced in each of Examples 2, 4, 6 and 8 and Comparative Examples 1 and 2 as reinforcements and the heat resistant rubber B as a parent rubber, in the same manner as in the water resistance evaluation, and then a heat-resistance and flexion-resistance running fatigue test was conducted to evaluate the heat resistance of the transmission belt. The heat resistance of the transmission belt was evaluated in terms of the tensile strength maintenance, i.e., a heat-resistance and flexion-resistance running fatigue performance as measured after running the transmission belt on a plurality of gearwheels i.e. pulleys under high temperatures for a certain period of time while bending the transmission belt.

Figure 3:
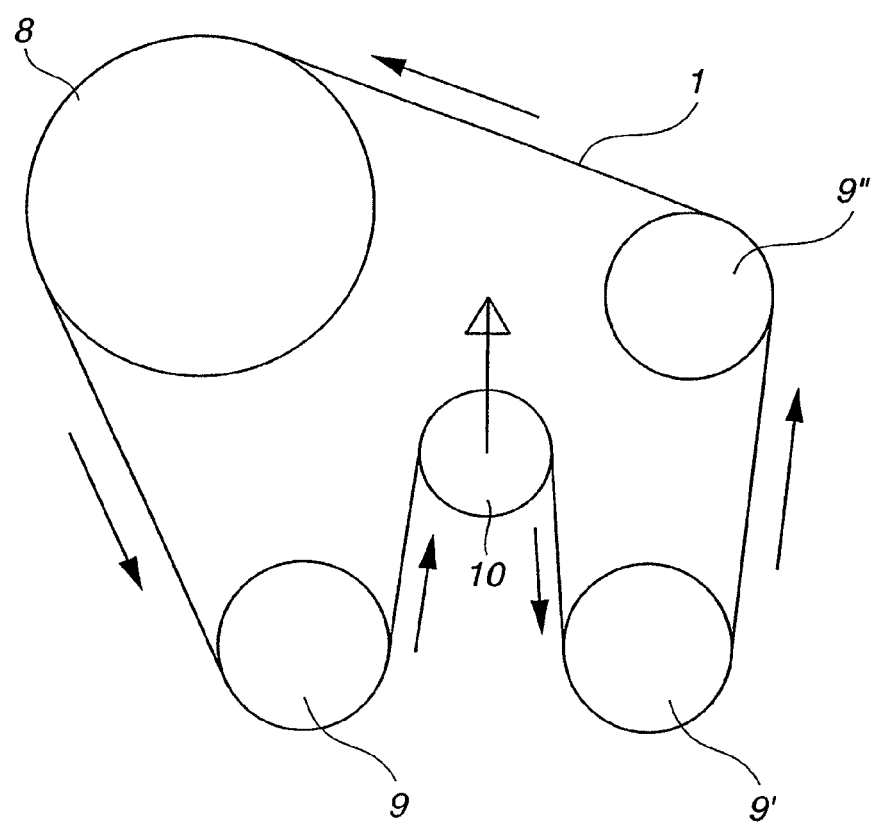
FIG. 3 is a schematic view of a heat-resistance and flexion-resistance running fatigue tester for the transmission belt.

FIG. 3 is a schematic view of a heat-resistance and flexion-resistance running fatigue tester for the transmission belt.

The heat resistance was tested by setting the transmission belt 1 in the heat-resistance and flexion-resistance running fatigue tester as shown in FIG. 3, the tester including a drive motor (not shown in the drawing). The transmission belt 1 was run by driving force of a drive pulley 8 rotated and driven by the drive motor, while rotating three driven pulleys 9, 9' and 9". An idler 10 was rotated during the heat-resistance and flexion-resistance running fatigue test to apply a load of 500 N to the transmission belt 1 thereby holding the transmission belt 1 under tension. The drive pulley 8 had a diameter of 120 mm and 40 teeth (T), while the driven pulleys 9, 9' and 9" had a diameter of 60 mm and 20 teeth (T). The rotation rate of the drive pulley 8 per minute in the heat-resistance and flexion-resistance running fatigue test was 3000 rpm, and the rotation rate of the driven pulleys 9, 9' and 9" per minute in the heat-resistance and flexion-resistance running fatigue test was 6000 rpm. The rotational direction is indicated in the drawings by arrows parallel with the transmission belt 1.

As shown in FIG. 3, the transmission belt 1 was run at a temperature of 130° C. by rotating the drive pulley 8 at 3000 rpm while bending the belt 1 with the driven pulleys 9, 9' and 9" and the idler 10. In the heat-resistance and flexion-resistance running fatigue test, the transmission belt 1 was run for 500 hours as explained above. The tensile strength of the transmission belt 1 was measured before and after the heat-resistance and flexion-resistance running fatigue test to determine the tensile strength maintenance of the transmission belt 1 before and after the test according to the mathematical expression 1. The heat-resistance and flexion-resistance running fatigue performance, i.e. the heat resistance of the transmission belts 1 provided with the rubber-reinforcing glass fibers 2 of Examples 2, 4, 6 and 8 and Comparative Examples 1 and 2 were compared and evaluated.

The tensile strength maintenance of each transmission belt after the heat-resistance and flexion-resistance running fatigue test is shown in Table 3.

TABLE 3

|  | Example 2 | Example 4 | Example 6 | Example 8 | Comparative Example 1 | Comparative Example 2 |
| --- | --- | --- | --- | --- | --- | --- |
| Tensile Strength Maintenance (%) | 96 | 93 | 96 | 95 | 90 | Broken in the course of running |

It is confirmed, from a result of the heat-resistance and flexion-resistance running fatigue test, that the transmission belt 1 provided with the rubber-reinforcing glass fibers 2 of the present invention had an excellent heat resistance as compared with the rubber-reinforcing glass fibers 2 of Comparative Examples 1 and 2.

The rubber-reinforcing glass fibers 2 of Examples 1 to 8 had good adhesion to HNBR material. Additionally, the transmission belt provided with the rubber-reinforcing glass fibers 2 of Examples 1 to 8 had good water resistance and heat resistance and therefore it is preferably used as reinforcements in the automotive transmission belts such as timing belt used in the presence of high-temperature and high-humidity for a long time.

What is claimed is:

1. A coating liquid for coating glass fiber cords, consisting essentially of:
    a chlorophenol-formaldehyde condensate (A) obtained by condensing a chlorophenol (D) and formaldehyde (E) in water;
    an emulsion of a vinylpyridine-styrene-butadiene copolymer (B);
    an emulsion of a chlorosulfonated polyethylene (C); and
    2-methoxyethanol or propylene glycol.

2. A coating liquid for coating glass fiber cords, as claimed in claim 1, wherein the 2-methoxyethanol or propylene glycol is added in an amount of not less than 50% and not more than 500% by weight based on 100% of weight of the chlorophenol-formaldehyde condensate (A).

3. A coating liquid for coating glass fiber cords, as claimed in claim 1, wherein the chlorophenol-formaldehyde condensate (A) has a mole ratio of the formaldehyde (E) to the monohydroxybenzene (D) of E/D=0.5 or more and 3.0 or less.

4. A coating liquid for coating glass fiber cords, as claimed in claim 1, wherein the chlorophenol-formaldehyde condensate (A), the vinylpyridine-styrene-butadiene copolymer (B) and the chlorosulfonated polyethylene (C) are A/(A+B+C)=1.0 wt % or more and 15.0 wt % or less, B/(A+B+C)=45.0 wt % or more and 82.0 wt % or less and C/(A+B+C)=3.0 wt % or more and 40.0 wt % or less, respectively.

5. A production method of the coating liquid for coating glass fiber cords, as claimed in claim 1, comprising the steps of:
    dissolving a precipitate of the chlorophenol-formaldehyde condensate (A) by adding the 2-methoxyethanol or propylene glycol, the precipitate of the chlorophenol-formaldehyde condensate (A) being formed by condensing the chlorophenol (D) and formaldehyde (E) in water; and then
    mixing the emulsion of the vinylpyridine-styrene-butadiene copolymer (B) and the emulsion of the chlorosulfonated polyethylene (C) thereinto.

6. A rubber-reinforcing glass fiber comprising:
    a glass fiber to which the coating liquid for coating glass fiber cords as claimed in claim 1 is applied and then dried; and
    a second coating layer formed on the glass fiber by applying a second coating liquid for coating glass fiber, the second coating liquid being produced by dispersing a chlorosulfonated polyethylene (C) and bisallylnadiimide (F) of F/C=0.3 wt % or more and 10.0 wt % or less in an organic solvent.

7. A transmission belt comprising:
    a heat resistant rubber; and
    the rubber-reinforcing glass fiber as claimed in claim 6, embedded in the heat resistant rubber.

8. A transmission belt as claimed in claim 7, wherein the heat resistant rubber includes a hydrogenated nitrile rubber.

9. A coating liquid for coating glass fiber cords, consisting essentially of:
    a chlorophenol-formaldehyde condensate (A) obtained by condensing a chlorophenol (D) and formaldehyde (E) in water;
    an emulsion of a vinylpyridine-styrene-butadiene copolymer (B);

an emulsion of a chlorosulfonated polyethylene (C); and
an amine compound,
wherein the amine compound is added in an amount of not less than 50% and not more than 500% by weight based on 100% of weight of the chlorophenol-formaldehyde condensate (A).

10. A coating liquid for coating glass fiber cords, as claimed in claim 9, wherein the amine compound has a basicity constant (Kb) of not less than $5 \times 10^{-5}$ and not more than $1 \times 10^{-3}$.

11. A coating liquid for coating glass fiber cords, as claimed in claim 9, wherein the amine compound is at least one selected from the group consisting of methylamine, ethylamine, tert-butylamine, dimethylamine, diethylamine, triethylamine, tri-n-buthylamine, methanolamine, dimethanolamine, monoethanolamine and diethanolamine.

12. A production method of the coating liquid for coating glass fiber cords, as claimed in claim 9, comprising the steps of:
dissolving a precipitate of the chlorophenol-formaldehyde condensate (A) by adding the amine compound, the precipitate of the chlorophenol-formaldehyde condensate (A) being formed by condensing the chlorophenol (D) and formaldehyde (E) in water; and then
mixing the emulsion of the vinylpyridine-styrene-butadiene copolymer (B) and the emulsion of the chlorosulfonated polyethylene (C) thereinto.

\* \* \* \* \*